(12) United States Patent
Chen

(10) Patent No.: US 9,176,569 B2
(45) Date of Patent: Nov. 3, 2015

(54) APPARATUS AND METHOD FOR DYNAMICALLY ADJUSTING FREQUENCY OF CENTRAL PROCESSING UNIT

(71) Applicant: Sony Corporation, Tokyo (JP)

(72) Inventor: Hu Chen, Shanghai (CN)

(73) Assignee: SONY CORPORATION, Tokyo (JP)

( * ) Notice: Subject to any disclaimer, the term of this patent is extended or adjusted under 35 U.S.C. 154(b) by 321 days.

(21) Appl. No.: 13/752,966

(22) Filed: Jan. 29, 2013

(65) Prior Publication Data

US 2013/0205149 A1    Aug. 8, 2013

(30) Foreign Application Priority Data

Feb. 6, 2012    (CN) .......................... 2012 1 0024946

(51) Int. Cl.
*G06F 1/00* (2006.01)
*G06F 1/32* (2006.01)

(52) U.S. Cl.
CPC ............. *G06F 1/324* (2013.01); *G06F 1/3225* (2013.01); *G06F 1/32* (2013.01); *Y02B 60/1217* (2013.01)

(58) Field of Classification Search
CPC ..... G06F 1/324; G06F 1/3203; G06F 1/3225; G06F 1/32
USPC ......................................................... 713/322
See application file for complete search history.

(56) References Cited

U.S. PATENT DOCUMENTS

| | | | |
|---|---|---|---|
| 6,378,081 B1 * | 4/2002 | Hammond | 713/501 |
| 2004/0073826 A1 * | 4/2004 | Yamashita et al. | 713/323 |
| 2004/0139362 A1 * | 7/2004 | Inaba | 713/322 |
| 2005/0057571 A1 * | 3/2005 | Stevens | 345/501 |
| 2005/0060594 A1 * | 3/2005 | Barr et al. | 713/600 |
| 2007/0234240 A1 * | 10/2007 | Entin et al. | 716/1 |
| 2008/0235364 A1 * | 9/2008 | Gorbatov et al. | 709/224 |

* cited by examiner

*Primary Examiner* — Thomas Lee
*Assistant Examiner* — Volvick Derose
(74) *Attorney, Agent, or Firm* — Oblon, McClelland, Maier & Neustadt, L.L.P.

(57) ABSTRACT

The embodiment of the application provides an apparatus and a method for dynamically adjusting a frequency of central processing unit CPU. The apparatus is used for a computer system which executes a CPU bound application and a memory bound application, and comprises: a ratio acquiring unit for acquiring the ratio of memory access instruction as executing an application task set; a frequency calculating unit connected with the ratio acquiring unit for calculating an adjusted new frequency of CPU in inverse proportional to the ratio of memory access instruction acquired by the ratio acquiring unit; and a frequency adjusting unit connected with the frequency calculating unit for adjusting the frequency of CPU to the new frequency of CPU. With the apparatus and method for adjusting the frequency of CPU according to the embodiment of the invention, the frequency of CPU can be decreased in consideration of the ratio of memory access instruction so as to reduce the power consumption of the computer system.

13 Claims, 3 Drawing Sheets

APPARATUS AND METHOD FOR DYNAMICALLY ADJUSTING FREQUENCY OF CENTRAL PROCESSING UNIT

BACKGROUND

The present invention relates to the field of computer system, and specially, relates to an apparatus and method and computer system for dynamically adjusting frequency of a central processing unit.

In the current computer system, a target value of a ratio of usage of CPU (Central Processing Unit) is generally set so that the CPU remains at a higher ratio of usage. Generally speaking, there are two choices in completing a same task in the computer system: one is running at a higher ratio of load (ratio of usage) of CPU with a lower frequency of CPU, the other is running at a lower ratio of load (ratio of usage) of CPU with a higher frequency of CPU. Since in the current computer system, the power consumption of the CPU is mainly related to the frequency thereof, i.e., is proportional to the square of the frequency thereof, that is, the lower the frequency of CPU is, the lower the power consumption is.

In recent years, the mainstream processors, for example, X86, ARM, etc. all support DVFS (Dynamic Voltage Frequency Scaling) technology. For example, in Linux system, there proposes a CPU control algorithm which is a dynamic scaling framework of the frequency of CPU based on the dynamic frequency scaling. In the method, there sets two thresholds of the frequency of CPU, and if the current ratio of usage of CPU is higher than the "high threshold", the frequency of CPU is increased; if the current ratio of usage of CPU is lower than the "low threshold", the frequency of CPU is decreased, so as to achieve the purpose of dynamically adjusting the frequency of CPU to reduce the power consumption.

However, with the complication of the computer system, there is a trend of further increase of the power consumption, thus, there still needs to research an apparatus and method for dynamically adjusting the frequency of CPU so that the power consumption is reduced.

SUMMARY

Therefore, the invention is made for the problem and need existed in the above related art.

The object of the embodiment of the invention is to provide an apparatus and method for dynamically adjusting the frequency of CPU, which is capable of dynamically adjusting the frequency of CPU based on the ratio of memory access instruction, so as to reduce the power consumption of the CPU.

In accordance with one aspect of the embodiment of the invention, there provides an apparatus for dynamically adjusting a frequency of central processing unit CPU for a computer system which executes a CPU bound application and a memory bound application, the apparatus comprises: a ratio acquiring unit for acquiring the ratio of memory access instruction as executing an application task set; a frequency calculating unit connected with the ratio acquiring unit for calculating an adjusted new frequency of CPU in inverse proportional to the ratio of memory access instruction acquired by the ratio acquiring unit; and a frequency adjusting unit connected with the frequency calculating unit for adjusting the frequency of CPU to the new frequency of CPU.

In the above apparatus for dynamically adjusting the frequency of CPU, the frequency calculating unit employs a negative feedback mechanism to calculate the adjusted new frequency of CPU by the following expression: $f_{new}=f_{now}+p_1*(-m)$, wherein, $f_{now}$ is the current frequency of CPU, $f_{new}$ is the adjusted new frequency of CPU, m is the ratio of memory access instruction and $p_1$ is a control parameter.

The above apparatus for dynamically adjusting the frequency of CPU further comprises: a ratio threshold setting unit for setting a threshold of ratio of memory access instruction; wherein, the frequency calculating unit further comprises: a first difference calculating unit connected with the ratio threshold setting unit and the ratio acquiring unit for calculating a difference between the ratio of memory access instruction and the threshold of ratio of memory access instruction; and the frequency calculating unit employs a negative feedback mechanism to calculate an adjusted new frequency of CPU by the following expression: $f_{new}=f_{now}+p_1*(m_t-m)$, wherein, $f_{now}$ is the current frequency of CPU, $f_{new}$ is the adjusted new frequency of CPU, m is the ratio of memory access instruction, $m_t$ is the threshold of ratio of memory access instruction and $p_1$ is a control parameter.

The above apparatus for dynamically adjusting the frequency of CPU further comprises: a ratio of usage acquiring unit for acquiring a ratio of usage of CPU; a threshold of ratio of usage setting unit for setting the threshold of ratio of usage of CPU; a ratio threshold setting unit for setting a threshold of ratio of memory access instruction; wherein, the frequency calculating unit further comprises: a first difference calculating unit connected with the ratio threshold setting unit and the ratio acquiring unit for calculating a first difference between the ratio of memory access instruction and the threshold of ratio of memory access instruction; and a second difference calculating unit connected with the ratio of usage acquiring unit and the threshold of ratio of usage setting unit for calculating a second difference between the ratio of usage of CPU and the threshold of ratio of usage of CPU; and the frequency calculating unit employs a negative feedback mechanism to calculate an adjusted new frequency of CPU by the following expression through a proportional controller: $f_{new}=f_{now}+p_1*(u-u_0)+p_2*(m_t-m)$, wherein, $f_{now}$ is the current frequency of CPU, $f_{new}$ is the adjusted new frequency of CPU, m is the ratio of memory access instruction, $m_t$ is the threshold of ratio of memory access instruction, u is the ratio of usage of CPU, $u_0$ is the threshold of ratio of usage of CPU, and $p_1$ and $p_2$ are control parameters.

In the above apparatus for dynamically adjusting the frequency of CPU, the ratio acquiring unit further comprises: an instruction number acquiring unit for reading a performance counter of the CPU to acquire a number of cache miss instructions $N_{cache\_miss}$; a ratio calculating unit for calculating the ratio m of memory access instruction by dividing the number of cache miss instructions $N_{cache\_miss}$ by a total number of instructions $N_{instr\_exec}$.

In the above apparatus for dynamically adjusting the frequency of CPU, the frequency adjusting unit comprises specifically: a frequency adjuster for selecting a frequency value of the new frequency of CPU which is closest to the adjusted new frequency of CPU and is larger than the adjusted new frequency of CPU from a frequency list supportable by the CPU based on the adjusted new frequency of CPU, and adjusting the frequency of CPU to the frequency value.

In the above apparatus for dynamically adjusting the frequency of CPU, the frequency of CPU is adjusted periodically with a control period T.

In accordance with another aspect of the embodiment of the invention, there provides a method for dynamically adjusting a frequency of CPU for a computer system which executes a CPU bound application and a memory bound application, the method comprises: acquiring a ratio of memory access instruction as executing an application task set; calculating an adjusted new frequency of CPU in inverse proportional to the ratio of memory access instruction acquired; and adjusting the frequency of CPU to the new frequency of CPU.

In the above method for dynamically adjusting the frequency of CPU, the step of calculating the adjusted new frequency of CPU in inverse proportional to the ratio of memory access instruction acquired comprises specifically: employing a negative feedback mechanism to calculate the adjusted new frequency of CPU by the following expression: $f_{new}=f_{now}+p_1*(-m)$, wherein, $f_{now}$ is the current frequency of CPU, $f_{new}$ is the adjusted new frequency of CPU, m is the ratio of memory access instruction and $p_1$ is a control parameter.

The above method for dynamically adjusting the frequency of CPU further comprises before the step of calculating the adjusted new frequency of CPU in inverse proportional to the ratio of memory access instruction acquired: setting a threshold of ratio of memory access instruction; and the step of calculating the adjusted new frequency of CPU in inverse proportional to the ratio of memory access instruction acquired comprises specifically: calculating a difference between the ratio of memory access instruction and the threshold of ratio of memory access instruction; and employing a negative feedback mechanism to calculate the adjusted new frequency of CPU by the following expression: $f_{new}=f_{now}+p_1*(m_t-m)$, wherein, $f_{now}$ is the current frequency of CPU, $f_{new}$ is the adjusted new frequency of CPU, m is the ratio of memory access instruction, $m_t$ is the threshold of ratio of memory access instruction and $p_1$ is a control parameter.

The above method for dynamically adjusting the frequency of CPU further comprises before the step of calculating the adjusted new frequency of CPU in inverse proportional to the ratio of memory access instruction acquired: acquiring a ratio of usage of CPU; setting a threshold of ratio of usage of CPU; setting a threshold of ratio of memory access instruction; and the step of calculating the adjusted new frequency of CPU in inverse proportional to the ratio of memory access instruction acquired comprises specifically: calculating a first difference between the ratio of memory access instruction and the threshold of ratio of memory access instruction; and calculating a second difference between the ratio of usage of CPU and the threshold of ratio of usage of CPU; and employing a negative feedback mechanism to calculate the adjusted new frequency of CPU by the following expression: $f_{new}=f_{now}+p_1*(u-u_0)+p_2*(m_t-m)$, wherein, $f_{now}$ is the current frequency of CPU, $f_{new}$ is the adjusted new frequency of CPU, m is the ratio of memory access instruction, $m_t$ is the threshold of ratio of memory access instruction, u is the ratio of usage of CPU, $u_0$ is the threshold of ratio of usage of CPU, and $p_1$ and $p_2$ are control parameters.

In the above method for dynamically adjusting the frequency of CPU, the step of acquiring the ratio of memory access instruction further comprises: reading a performance counter of the CPU to acquire a number of cache miss instructions $N_{cache\_miss}$; calculating the ratio m of memory access instruction by dividing the number of cache miss instructions $N_{cache\_miss}$ by a total number of instructions $N_{instr\_exec}$.

In the above method for dynamically adjusting the frequency of CPU, the step of adjusting the frequency of CPU to the new frequency of CPU comprises specifically: selecting a frequency value of the new frequency of CPU which is closest to the adjusted new frequency of CPU and is larger than the adjusted new frequency of CPU from a frequency list supportable by the CPU based on the adjusted new frequency of CPU and adjusting the frequency of CPU to the frequency value.

In the above method for dynamically adjusting the frequency of CPU, the frequency of CPU is adjusted periodically with a control period T.

In accordance with yet another aspect of the embodiment of the invention, there provides a computer system for executing a CPU bound application and a memory bound application, which comprises: a controller for acquiring a ratio of memory access instruction as executing an application task set, calculating an adjusted new frequency of CPU in inverse proportional to the ratio of memory access instruction acquired and adjusting the frequency of CPU to the new frequency of CPU.

With the apparatus and method and computer system for adjusting the frequency of CPU in accordance with the embodiment of the invention, the frequency of CPU can be decreased in consideration of the ratio of memory access instruction so as to reduce the power consumption of the computer system.

BRIEF DESCRIPTION OF THE DRAWINGS

For explaining the technical solution in the embodiment of the invention or in the related art more clearly, the figures necessary in the description of the embodiment or the related art are explained simply as follows, it is obvious for those skilled in the art that the figures in the following description are only some embodiments of the invention, and other figures can be obtained from these figures without inventive work.

DETAILED DESCRIPTION

Figure 1:
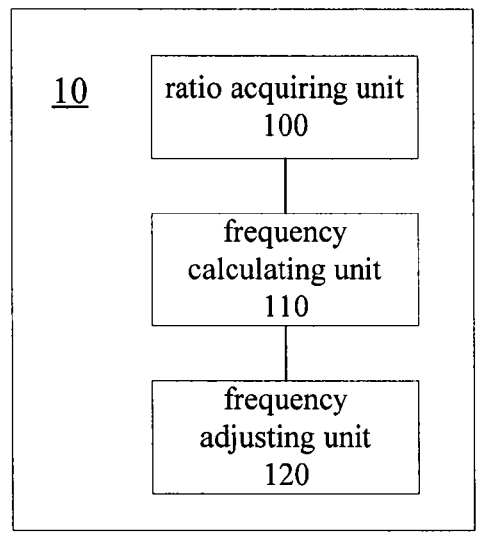
FIG. 1 is a block graph of an apparatus for dynamically adjusting the frequency of CPU according to the embodiment of the invention.

In order to further clarify the technical problem to be solved, the technical solution and advantage of the embodiment of the application, the detailed embodiment will be described in connection with the accompanied drawings.

In the current computer system, there are mainly two types of applications, i.e., a CPU bound application and a memory bound application. The CPU bound application uses the CPU at most time, and the memory bound application needs to access the memory, which is typically the memory of the computer, frequently. Accordingly, the CPU instruction executing the above applications can be classified as "memory access instruction" and other instructions, for example "calculating instruction (add and subtract, etc.). And, since in the computer system, the frequency of memory is generally much less than the frequency of CPU, it does not need a higher frequency of CPU as executing the instruction on accessing the memory (it also referred to as memory access instruction as brief).

Here, the power consumption of the chip in the computer system are mainly classified as static power and dynamic power (switching power), and the dynamic power consumption is much more than the static power consumption, the relationship between the dynamic power and the frequency and voltage is as follows:

$$P = \alpha * CV^2 f$$

Wherein, C is a capacitance value switched in each clock period, V is a voltage, f is a switching frequency (i.e., the frequency of the chip). Please refer to "Digital Integrated Circuits" by J. M. Rabaey, Prentice Hall, 1996, for details.

As mentioned above, since the power consumption of the CPU is proportionate to the square of the frequency thereof, the power consumption of the computer system can be reduced significantly by decreasing the frequency of CPU while maintaining the performance of the system. However, in some cases, the lowest frequency of CPU does not lead to the lowest system level power consumption, and the system-level power consumption will increase again as passing through a lowest point as the frequency of CPU decreases. The reason for the above cases is that a lower frequency of CPU will extend the execution time of the program for a CPU bound task, the memory of the computer system is consuming the power at this time though it is not used, thus, the entire power consumption of the system is increased. Therefore, the purpose of reducing the power consumption can not be achieved by only decreasing the frequency of CPU for the CPU bound application.

As to the above problem, the embodiment of the invention considers the property of the memory bound application, that is, since the frequency of memory is generally much less than the frequency of CPU, the execution of the memory access instruction does not need a very high frequency of CPU. Therefore, the main principal of the embodiment of the invention is that the higher the ratio of the corresponding memory access instruction in the task set executed by the computer system is, the less the need of executing a CPU bound instruction by a high frequency of CPU is, so that the frequency of CPU can be decreased correspondingly to achieve the purpose of reducing the power consumption of the computer system.

In accordance with one aspect of the embodiment of the invention, there provides an apparatus for dynamically adjusting frequency of CPU for a computer system which executes a CPU bound application and a memory bound application, the apparatus comprises: a ratio acquiring unit for acquiring a ratio of memory access instruction as executing an application task set; a frequency calculating unit connected with the ratio acquiring unit for calculating an adjusted new frequency of CPU in inverse proportional to the ratio of memory access instruction acquired by the ratio acquiring unit; and a frequency adjusting unit connected with the frequency calculating unit for adjusting the frequency of CPU to the new frequency of CPU.

With the above apparatus for dynamically adjusting the frequency of CPU, the ratio of memory access instruction to all of the instructions in the application task set executed by the CPU can be obtained, so that the frequency of CPU is decreased correspondingly in case that the ratio of memory access instruction in all of the instructions in the task set is relatively high to reduce the power consumption of the computer system.

As mentioned above, since in the current computer system, the dependency to the high frequency of CPU is less for the memory access instruction in the task set, i.e., even the frequency of CPU is relative low, it does not has a significant influence on the execution of this instruction, so that it is possible to reduce the power consumption by decreasing the frequency of CPU greatly. Therefore, by acquiring the ratio of memory access instruction to all of the instructions in a task set as executing the task set by the computer system, the frequency of CPU can be decreased correspondingly in case that the ratio of memory access instruction is relatively high, thus, it not only guarantees the execution time of the CPU bound instruction so as not to extend the execution time of the task set excessively, but also decreases the frequency of CPU correspondingly so as to reduce the power consumption of the computer system significantly.

FIG. 1 is a block graph of an apparatus for dynamically adjusting the frequency of CPU according to the embodiment of the invention. As shown in FIG. 1, the apparatus 10 for dynamically adjusting the frequency of CPU is used in a computer system which executes a CPU bound application and a memory bound application, the apparatus 10 comprises: a ratio acquiring unit 100 for acquiring a ratio of memory access instruction as executing an application task set; a frequency calculating unit 110 connected with the ratio acquiring unit 100 for calculating an adjusted new frequency of CPU in inverse proportional to the ratio of memory access instruction acquired by the ratio acquiring unit 100; and a frequency adjusting unit 120 connected with the frequency calculating unit 110 for adjusting the frequency of CPU to the new frequency of CPU calculated by the frequency calculating unit 110.

The ratio acquiring unit 100 and the frequency computing unit 110 in the apparatus 10 will be particularly described as follow.

Firstly, The ratio acquiring unit according to the embodiment of the invention is described. In the current computer system, the mainstream processors such as X86, ARM are provided with a Performance Counter to provide the statistic information of the instruction. In the ratio acquiring unit of the embodiment of the invention, a number of memory access instruction and a number of all of the instructions in a time period can be obtained from the above performance counter directly to calculate the ratio of memory access instruction. Besides, since in the framework of certain computer system, the number of memory access instruction in a time period can not be obtained directly, the ratio of memory access instruction can be obtained by other indirect means. For example, in a computer system, when an application task set is executed, the cache of the computer system is usually accessed firstly, then the memory of the computer system is accessed. Therefore, if the access to the cache fails, it would certainly lead to the access to the memory, thus the number of cache miss instruction $N_{cache\_miss}$ can be regarded as the number of memory access instruction. Thus, assuming that the total number of instructions in the time period is $N_{instr\_exec}$ and the ratio of memory access instruction is expressed by m, it satisfies the following equation:

$$m = N_{cache\_miss}/N_{instr\_exec} \qquad \text{Equation 1}$$

That is, the ratio acquiring unit 100 according to the embodiment of the invention can further comprise: an instruction number reading unit for reading a performance counter of the CPU to acquire a number of cache miss instruction $N_{cache\_miss}$; and a ratio calculating unit for calculating the ratio m of memory access instruction by dividing the number of cache miss instruction $N_{cache\_miss}$ by the total number of instructions $N_{instr\_exec}$.

Next, the frequency calculating unit according to the embodiment of the invention is explained. As mentioned above, in the apparatus for dynamically adjusting the frequency of CPU according to the embodiment of the invention, the frequency of CPU is adjusted in inverse proportional to the ratio of memory access instruction. Specifically, a negative feedback mechanism is employed to implement the frequency calculating unit according to the embodiment of the invention, that is, assuming the current frequency of CPU is $f_{now}$, and the adjusted new frequency of CPU is $f_{new}$, it satisfies the following equation:

$$f_{new}=f_{now}+p_1*(-m) \quad \text{Equation 2}$$

Here, m is the ratio of memory access instruction acquired in the ratio acquiring unit, and $p_1$ is a corresponding control parameter. In a practical computer system, for example, MiBench, the range of the ratio of memory access instruction is usually 0.00015 to 0.015. Therefore, assuming the frequency of CPU of the current computer system as f, the value of $p_1$ is preferably in the range of 60*f to 300*f. Take TI OMAP 4430 CPU as an example, $p_1$ is 30,000 MHz. Here, those skilled in the art can understand that the control parameter $p_1$ depends on the implementation of the parameter of the specific hardware such as CPU and memory and the driver application, and the embodiment of the invention is not restricted particularly thereto.

According to the control principal, the negative feedback system does not need detailed information of the controlled object, and for the task set executed in the embedded system of the current computer system, it is difficult to know the detailed information, thus, it is appropriate to adjust the frequency using the negative feedback mechanism. Certainly, those skilled in the art can understand that the frequency calculating unit of the embodiment of the invention can employ other mechanism as long as the frequency of CPU is adjusted in inverse proportional to the ratio of memory access instruction, and the embodiment of the invention is not restricted particularly thereto.

Further, in the above ratio acquiring unit according to embodiment of the invention, it can further comprises a ratio threshold setting unit for setting a threshold $m_t$ of ratio of memory access instruction, and the frequency of CPU is adjusted in case that the ratio m of memory access instruction is larger than the threshold $m_t$ of ratio of memory access instruction. Also, in the case of the frequency calculating unit employing the above negative feedback mechanism, assuming the current frequency of CPU is $f_{now}$, and the adjusted new frequency of CPU is $f_{new}$, it satisfies the following equation:

$$f_{new}=f_{now}+p_1*(m_t=m) \quad \text{Equation 3}$$

In particular, in the frequency calculating unit according to the embodiment of the invention, it can comprise a first difference calculating unit connected with the ratio threshold setting unit and the ratio acquiring unit for calculating a difference between the ratio m of memory access instruction and the threshold $m_t$ of ratio of memory access instruction, thus, the adjusted new frequency of CPU can be calculated based on the difference.

The purpose for setting the threshold $m_t$ of ratio of memory access instruction is that the frequency of CPU is only decreased in case that the ratio m of memory access instruction is larger than the threshold $m_t$ of ratio of memory access instruction. In particular, if the ratio m of memory access instruction is less than the threshold $m_t$ of ratio of memory access instruction, the task set in this period is likely a task set of "CPU bound", and in this case, the frequency of CPU should be increased appropriately to shorten the execution time of the "task set" to reduce the power consumption of the memory in the execution time so as to reduce the system level power consumption. And, due to the increase of the frequency of CPU, the performance of the system is enhanced. On the contrary, if the ratio m of memory access instruction is larger than the threshold $m_t$ of ratio of memory access instruction, the task set in this period is likely a task set of "memory bound", it means that the execution time of the task set depends on the access time of the memory instead of the frequency of CPU, and in this case, as mentioned above, the power consumption of the CPU is reduced by decreasing the frequency of CPU appropriately so as to reduce the power consumption of the entire computer system.

As mentioned above, it also takes Mibench as an example, in the practical computer system, the range of the ratio m of memory access instruction is approximately from 0.00015 to 0.015, therefore, in the embodiment of the invention, the threshold $m_t$ of ratio of memory access instruction is set to ten times of the minimum of the ratio m of memory access instruction, i.e., 0.0015. Also, in other computer systems, it preferably sets the threshold $m_t$ of ratio of memory access instruction to ten times of minimum of the ratio m of memory access instruction, i.e., $m_t=10*m_{min}$, and the experiment proves that this value of $m_t$ has a better power saving effect.

As mentioned before, it employs a ratio of usage of CPU as the index for adjusting the frequency of CPU so as to achieve the purpose of saving power consumption, in the apparatus for adjusting the frequency of CPU according to the embodiment of the invention, the frequency can be adjusted in combination with the ratio of usage of CPU.

As is mentioned before apparatus for dynamically adjusting the frequency of CPU, it can further comprise a ratio of usage of CPU acquiring unit for acquiring a ratio of usage of CPU as executing an application task set. And, the frequency calculating unit is further connected with the ratio of usage of CPU acquiring unit for calculating the frequency of CPU based on the ratio of memory access instruction acquired by the ratio acquiring unit and the ratio of usage of CPU acquired by the ratio of usage of CPU acquiring unit.

In the apparatus for adjusting the frequency of CPU according to the embodiment of the invention, the apparatus may further include a ratio of CPU usage acquiring unit for acquiring a ratio of CPU usage as executing an application task set. Moreover, the frequency calculating unit is further connected with the ratio of CPU usage acquiring unit in order to adjust the frequency of CPU based on the proportion of memory access instructions acquired by the ratio acquiring unit and the ratio of CPU usage acquired by the ratio of usage acquiring unit.

Figure 2:
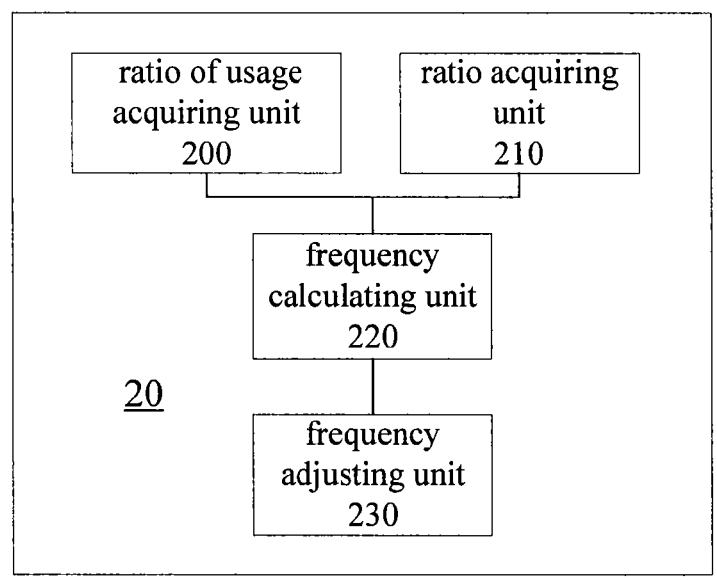
FIG. 2 is a block graph of another apparatus for dynamically adjusting the frequency of CPU according to the embodiment of the invention.

FIG. 2 is a block graph of another apparatus for dynamically adjusting the frequency of CPU according to the embodiment of the invention. As shown in FIG. 2, the apparatus 20 for dynamically adjusting the frequency of CPU is used in a computer system which executes a CPU bound application and a memory bound application, the apparatus 20 comprises: a ratio of usage acquiring unit 200 for acquiring a ratio of usage of CPU as executing an application task set; a ratio acquiring unit 210 for acquiring a ratio of memory access instruction as executing the application task set; a frequency calculating unit 220 connected with the ratio of usage acquiring unit 200 and the ratio acquiring unit 210 for calculating an adjusted new frequency of CPU based on the ratio of usage of CPU acquired by the ratio of usage acquiring unit 200 and the ratio of memory access instruction acquired by the ratio acquiring unit 210; and a frequency adjusting unit 230 connected with the frequency calculating unit 220 for adjusting the frequency of CPU to the new frequency of CPU.

As to the ratio of usage acquiring unit of the above apparatus 20, it has been proposed in the related art, that acquiring the ratio of usage of CPU in a time period, for example, in Linux, the ratio of usage of CPU is calculated by calculating a value of /proc/stat for CPU or each core of the multi-core CPU. Further, a control target of the ratio of usage of CPU, i.e., a threshold of ratio of usage of CPU $u_0$ can be preset.

Also, similar to the frequency calculating unit 110 for adjusting the frequency of CPU only based on the ratio of memory access instruction, the frequency calculating unit 220 for adjusting the frequency of CPU based on both of the ratio of usage of CPU and the ratio of memory access instruction can also employ a negative feedback mechanism. In particular, assuming that the current frequency of CPU is $f_{now}$, and the adjusted new frequency of CPU is $f_{new}$, the adjusted new frequency of CPU can be calculated by a proportional controller, and it satisfies the following equation:

$$f_{new} = f_{now} + p_1 * (u - u_0) + p_2 * (m_t - m) \qquad \text{Equation 4}$$

In particular, the apparatus 20 for dynamically adjusting the frequency of CPU according to the embodiment of the invention further comprises: a threshold of ratio of usage setting unit for setting the threshold of ratio of usage of CPU; a ratio threshold setting unit for setting a threshold of ratio of memory access instruction. And, the frequency calculating unit 220 can further comprise: a first difference calculating unit connected with the ratio threshold setting unit and the ratio acquiring unit for calculating a first difference between the ratio m of memory access instruction and the threshold $m_t$ of ratio of memory access instruction; and a second difference calculating unit connected with the ratio of usage acquiring unit and the threshold of ratio of usage setting unit for calculating a second difference between the ratio u of usage of CPU and the threshold $u_0$ of ratio of usage of CPU, thus, the adjusted new frequency of CPU can be calculated based on the above first difference and second difference.

Similar to the above frequency calculating unit 110, the control parameters $p_1$ and $p_2$ in the frequency calculating unit 220 are all positive, and preferably, assuming the frequency of CPU is f, the range of the value of $p_1$ is from f/5 to 10*f, and the range of the value of $p_2$ is from 60*f to 300*f. Also, taking TI OMAP 4430 CPU as an example, a preferable set of the recommended value of the control parameters is $p_1$=600 MHz and $p_2$=30,000 MHz. Also, the control parameters depend on the implementation of the parameters of the specific hardware such as CPU and memory and the driver application, and the embodiment of the invention is not restricted particularly thereto.

In the CPU control algorithm of the classic Linux system, it is generally configured that if the ratio of usage of CPU is larger than 95%, the frequency of CPU is increased in the next period. And, in consideration of schedulability, that is, if the load of the CPU is excessively high, the response may not be on time, in the embodiment of the invention, the target ratio of usage is preferably set to lower than 95%. Taking Panda Board of which CPU is OMAP 4430 (ARM Cortex A9 double-core) as an example, if UBUNTU 11.04 is running thereon, the experimental result reveals that the effect is better as $u_0$ is set as 85%.

The proportional controller is a classic controller, since the proportional controller is used for the control at current time, it has a high convergence and better stability, a stable output can be obtained by controlling the frequency of CPU with the proportional controller in consideration of the uncertainty of the task set of the computer system, so as to implement a stable control of the frequency of CPU.

Further, those skilled in the art can understand that in the frequency calculating unit 220 according to the embodiment of the invention, other mechanism can be employed to adjust the frequency of CPU, for example, assuming the current frequency of CPU is $f_{now}$, and the adjusted new frequency of CPU is $f_{new}$, the adjusted new frequency of CPU can be calculated by a mechanism as shown in the following equation:

$$f_{new} = f_{now} + p_1 * (u - u_0) + p_2 * \frac{f_{now}}{f_{mem}} * (m_t - m) \qquad \text{Equation 5}$$

Wherein, $f_{mem}$ is the working frequency of the memory. Further, the frequency calculating unit 220 according to the embodiment of the invention can also employ a PID (Proportional Integral Derivative Controller) to calculate the adjusted new frequency of CPU, wherein, the proportional integral derivative controller further comprises an integral controller for eliminating an accumulated error and a derivative controller for future control in addition to the proportional controller for the control at current time as mentioned above. Here, those skilled in the art can understand that the frequency calculating unit according to the embodiment of the invention only needs to satisfy the demand of decreasing the frequency of CPU as the ratio m of memory access instruction increases, the detailed means for adjusting does not need an unnecessary limitation.

In the above apparatus for adjusting the frequency of CPU according to the embodiment of the invention, after the adjusted new frequency of CPU is calculated based on the ratio of memory access instruction or both of the ratio of memory access instruction and the ratio of usage of CPU by the frequency calculating unit, the frequency of CPU of the computer system is controlled to be adjusted by the frequency adjusting unit. In particular, the frequency adjusting unit according to the embodiment of the invention can comprise a frequency adjuster for adjusting the frequency of CPU based on the calculated new frequency of CPU. In the current computer system, the frequency supportable by the CPU is discrete, and it is stored in a frequency list as the frequency supportable by the CPU, thus, the frequency adjuster selects a frequency value which is closest to the adjusted new frequency of CPU $f_{new}$ and is larger than the frequency $f_{new}$ from the frequency list as the new frequency of CPU based on the calculated new frequency of the CPU $f_{new}$.

In the apparatus for adjusting the frequency of CPU according to the embodiment of the invention, the dynamic adjusting of the frequency of CPU can be set as periodic, and it can dynamically adjust the frequency of CPU according to other specific condition such as the instruction of user. Preferably, in the apparatus for adjusting the frequency of CPU according to the embodiment of the invention, the frequency of CPU is adjusted periodically based on the running of the task set, for example, the period of adjusting the frequency of CPU can be set as T. In the apparatus for adjusting the frequency of CPU according to the embodiment of the invention, since the alternation of the frequency of CPU needs a certain time to take effect which is referred to as Transition Latency ($T_L$), the control period T is selected as second level, i.e., from several seconds to several ten seconds in the embodiment of the invention in consideration that the alternation of the frequency of CPU itself needs to consume certain power. And, in the above frequency adjusting method in Linux, the control period is generally set as a thousand times of $T_L$ to ten seconds.

With the apparatus for adjusting the frequency of CPU according to the embodiment of the invention, the frequency of CPU can be decreased in consideration of the ratio of memory access instruction so as to reduce the power consumption of the computer system. The experiment proves that when the adjusted new frequency of CPU is calculated by Equation 4 and the frequency is adjusted accordingly, and it takes TI OMAP 4430 CPU as an example, if the control parameters are selected as $p_1$=600 MHz and $p_2$=30,000 MHz, and $m_t$=0.0015 and $u_0$=85%, an effect of power consumption reduction from 15% to 30% can be achieved, so that the performance of the computer system is improved significantly.

In accordance with another aspect of the embodiment of the invention, there provides a method for dynamically adjusting a frequency of CPU for a computer system which executes a CPU bound application and a memory bound application, the method comprises: acquiring a ratio of memory access instruction as executing an application task set; calculating an adjusted new frequency of CPU in inverse proportional to the ratio of memory access instruction acquired; and adjusting the frequency of CPU to the new frequency of CPU.

In the above method for dynamically adjusting the frequency of CPU, the step of calculating the adjusted new frequency of CPU in inverse proportional to the ratio of memory access instruction acquired comprises specifically: employing a negative feedback mechanism to calculate the adjusted new frequency of CPU by the following expression: $f_{new} 32 f_{now}+p_1*(-m)$, wherein, $f_{now}$ is the current frequency of CPU, $f_{new}$ is the adjusted new frequency of CPU, m is the ratio of memory access instruction and $p_1$ is a control parameter.

The above method for dynamically adjusting the frequency of CPU further comprises before the step of calculating the adjusted new frequency of CPU in inverse proportional to the ratio of memory access instruction acquired: setting a threshold of ratio of memory access instruction; and the step of calculating the adjusted new frequency of CPU in inverse proportional to the ratio of memory access instruction acquired comprises specifically: calculating a difference between the ratio of memory access instruction and the threshold of ratio of memory access instruction; and employing a negative feedback mechanism to calculate the adjusted new frequency of CPU by the following expression: $f_{new}=f_{now}+p_1*(m_t-m)$, wherein, $f_{now}$ is the current frequency of CPU, $f_{new}$ is the adjusted new frequency of CPU, m is the ratio of memory access instruction, $m_t$ is the threshold of ratio of memory access instruction and $p_1$ is a control parameter.

The above method for dynamically adjusting the frequency of CPU further comprises before the step of calculating the adjusted new frequency of CPU in inverse proportional to the ratio of memory access instruction acquired: acquiring a ratio of usage of CPU; setting a threshold of ratio of usage of CPU; setting a threshold of ratio of memory access instruction; and the step of calculating the adjusted new frequency of CPU in inverse proportional to the ratio of memory access instruction acquired comprises specifically: calculating a first difference between the ratio of memory access instruction and the threshold of ratio of memory access instruction; calculating a second difference between the ratio of usage of CPU and the threshold of ratio of usage of CPU; and employing a negative feedback mechanism to calculate the adjusted new frequency of CPU by the following equation: $f_{new}=f_{now}+p_1*(u-u_0)+p_2*(m_t-m)$, wherein, $f_{now}$ is the current frequency of CPU, $f_{new}$ is the adjusted new frequency of CPU, m is the ratio of memory access instruction, $m_t$ is the threshold of ratio of memory access instruction, u is the ratio of usage of CPU, $u_0$ is the threshold of ratio of usage of CPU, and $p_1$ and $p_2$ are control parameters.

In the above method for dynamically adjusting the frequency of CPU, the step of acquiring the ratio of memory access instruction further comprises: reading a performance counter of the CPU to acquire a number of cache miss instruction $N_{cache\_miss}$; calculating the ratio m of memory access instruction by dividing the number of cache miss instruction $N_{cache\_miss}$ by a total number of instructions $N_{instr\_exec}$.

In the above method for dynamically adjusting the frequency of CPU, the step of adjusting the frequency of CPU to the new frequency of CPU comprises specifically: selecting a frequency value of the new frequency of CPU which is closest to the adjusted new frequency of CPU and is larger than the adjusted new frequency of CPU from a frequency list supportable by the CPU based on the adjusted new frequency of CPU and adjusting the frequency of CPU to the frequency.

In the above method for dynamically adjusting the frequency of CPU, the frequency of CPU is adjusted periodically with a control period T.

Figure 3:
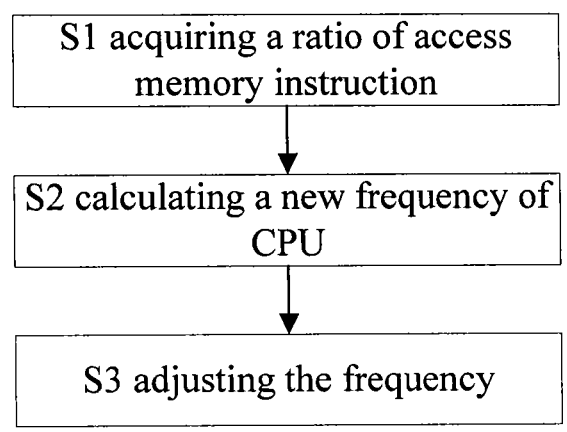
FIG. 3 is a schematic flowchart illustrating a method for dynamically adjusting the frequency of CPU according to the embodiment of the invention.

FIG. 3 is a schematic flowchart illustrating a method for dynamically adjusting the frequency of CPU according to the embodiment of the invention. As shown in FIG. 3, the method is used for a computer system which executes a CPU bound application and a memory bound application, the method comprises: S1, acquiring a ratio of memory access instruction as executing an application task set; S2, calculating an adjusted new frequency of CPU in inverse proportional to the ratio of memory access instruction acquired; and S3, adjusting the frequency of CPU to the new frequency of CPU.

As mentioned above, with the method for adjusting the frequency of CPU according to the embodiment of the invention, the frequency of CPU can be decreased in consideration of the ratio of memory access instruction so as to reduce the power consumption of the computer system. Also, the detailed description made for the apparatus for adjusting the frequency of CPU according to the embodiment of the invention before can be applied to the method for adjusting the frequency of CPU according to the embodiment of the invention equivalently here, and the detailed description will be omitted in order to avoid redundancy.

Figure 4:
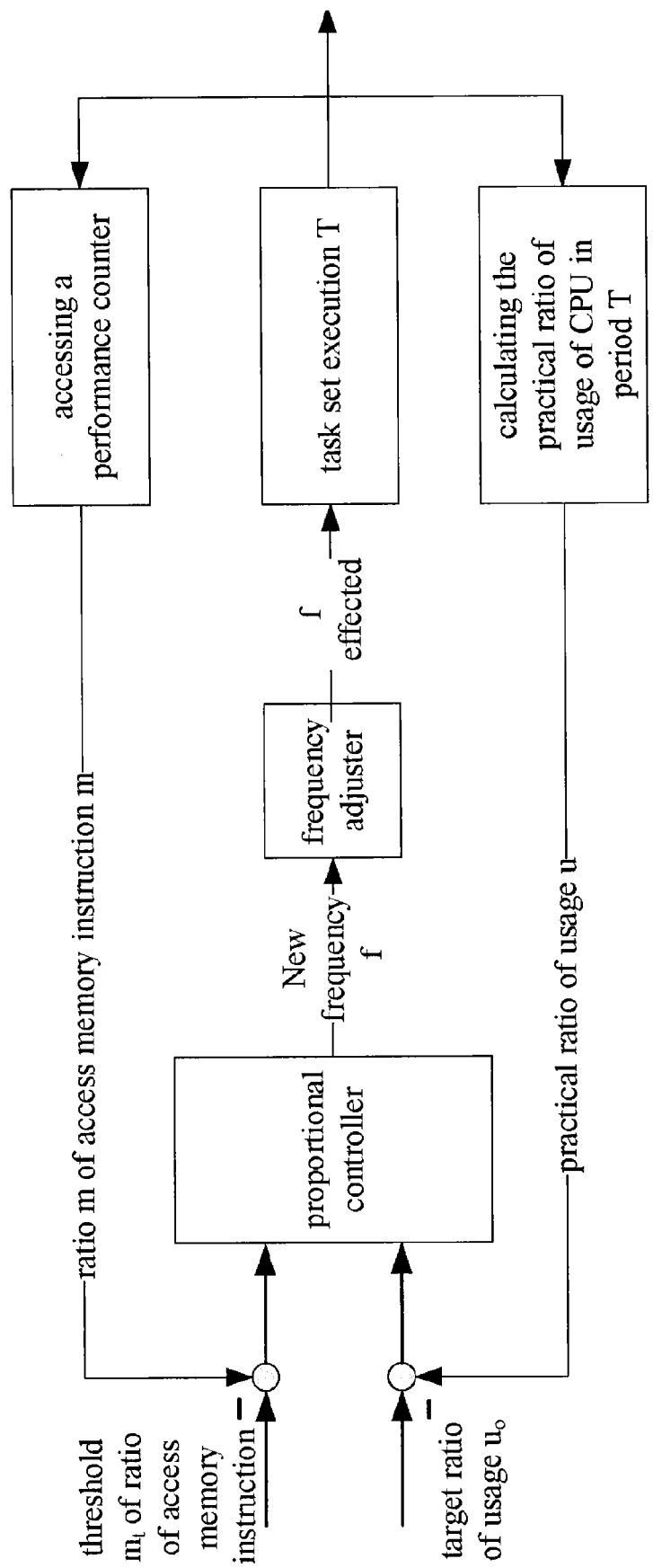
FIG. 4 is a schematic block graph illustrating a system for dynamically adjusting the frequency of CPU according to the embodiment of the invention.

As mentioned above, in the apparatus and method for dynamically adjusting the frequency of CPU according to the embodiment of the invention, it preferably employs the negative feedback mechanism and the proportional controller to implement the dynamic adjusting of the frequency of CPU. FIG. 4 is a schematic block graph illustrating a system for dynamically adjusting the frequency of CPU according to the embodiment of the invention. As shown in FIG. 4, when the system according to the embodiment of the invention is running, a control target of the ratio of usage of CPU is set to, for example, $u_0$, and it is assumed that $u_0$ is optimal value, and a threshold of ratio of memory access instruction is set to, for example, $m_t$. Then, in each control period T, the ratio of usage u in period T of the CPU or each core of the CPU is detected, for example, in Linux, it is calculated by calculating the value of /proc/stat. Then, the performance counter of the CPU is read by software to make a statistic of the ratio m of memory access instruction in the period T, wherein 0<m<1. As mentioned above, for example, the number of cache miss instruction $N_{cache\_miss}$ can be regarded as the number of the memory access instruction, since the failure in accessing cache must lead to accessing the memory, thus m is calculated as the number of cache miss instruction dividing the total number of instructions $N_{instr\_exec}$, i.e., $m=N_{cache\_miss}/N_{instr\_exec}$. And, $u-u_0$ and $m_t-m$ are the input of the proportional controller, and the proportional controller outputs the new frequency of CPU $f_{new}$ based on the formula $f_{new}=f_{now}+p_1*(u-u_0)+p_2*(m_t-m)$. Then, the frequency adjuster selects a value closet to $f_{new}$ and larger than $f_{new}$ in the frequency list supportable by the CPU as the new frequency of CPU. Thus, the task set is running based on the adjusted new frequency of CPU and lasts for a period T until a next new frequency of CPU is received.

As mentioned above, when it employs the system as shown in FIG. 4, as taking TI OMAP 4430 CPU as an example, if the control parameters are selected as $p_1$=600 MHz and $p_2$=30,000 MHz, and $m_t$=0.0015 and $u_0$=85%, an effect of power consumption reduction of 15% to 30% can be achieved, so that the performance of the computer system is improved significantly.

With the apparatus and method for adjusting the frequency of CPU in accordance with the embodiment of the invention, the frequency of CPU can be decreased in consideration of the ratio of memory access instruction so as to reduce the power consumption of the computer system.

Further, those skilled in the art can understand that the apparatus and method for adjusting the frequency of CPU in accordance with the embodiment of the invention can be implemented as a computer system specifically, the computer system executes a CPU bound application and a memory bound application, which comprises: a controller for acquiring a ratio of memory access instruction as executing an application task set, calculating an adjusted new frequency of CPU in inverse proportional to the ratio of memory access instruction acquired and adjusting the frequency of CPU to the new frequency of CPU.

Those skilled in the art can understand that, the units and algorithm steps of the examples described in combination with the embodiments disclosed in the specification can be implemented by an electronic hardware, a computer software or both of them, in order to explain the interchangeability of hardware and software clearly, the constitution and step of the respective examples is described generally according to the function in the above explanation. Whether these functions are implemented by hardware or software depends on the specific application of the technical solution and the design restrictions. Those skilled in the art can use different methods to implement the described function for each specific application, and this implementation should not be regarded as beyond the disclosure of the invention.

Those skilled in the art can understand that, for the convenience and simplicity of description, the detailed operational procedure of the above system, apparatus and method can correspond to the corresponding procedure in the method embodiment, and shall not be described any more.

In the several embodiments in the invention, it can be understood that the disclosed system, apparatus and method can be implemented by other means. For example, the apparatus embodiment mentioned above is only schematic, for example, the division of the units is only a logical functional division, and there can be other means of division in practical use, for example, multiple units or components can be combined or integrated to another system, or some features can be omitted, or do not operate. Further, the coupling therebetween or the direct coupling or communication connection can be implemented by indirect coupling or communication connection of some interfaces, apparatus and units, and they can be electric, mechanic or in other form.

The units described as separate components may be or may not be physically separated, the components shown as units may be or may not be physical units, i.e., they can be located at a same position, or distributed on a plurality of network units. The object of the solution of the embodiment can be implemented by selecting part or all of the units according to the practical need.

Further, the respective functional units in the respective embodiments of the invention can be integrated in a processing unit, and the respective units can be individual, or two or more of units can be integrated in a unit. The above integrated unit can be implemented by the form of hardware or the form of software functional unit.

If the integrated unit is implemented in the form of software functional unit and sold and used as an individual product, it can be stored in a computer readable storage medium. Based on this understanding, the essential technical solution of the invention or the part contributed to the related art or part or all of the technical solution can be embodied as a software product, and this computer software product is stored on storage medium, includes some instructions to cause a computer (PC, server or networked apparatus, etc.) to perform part or all of the steps of the method of the embodiment of the invention. And the storage medium includes medium storing program code such as U disc, mobile hard driver, ROM, RAM, magnetic disc or optical disc, etc.

The above-mentioned is only the preferred implementation for carrying out the invention. It should be pointed out that, for those ordinarily skilled in the art, on the condition of not deviating from the principle mentioned in the present invention, several improvements and refinements can be made as well, which should be also treated as the scope protected by the present invention.

What is claimed is:

1. An apparatus for dynamically adjusting a frequency of a central processing unit (CPU) for a computer system which executes a CPU bound application and a memory bound application, the apparatus comprising:
    a ratio acquiring unit for acquiring a ratio of memory access instruction as executing an application task set;
    a frequency calculating unit connected with the ratio acquiring unit for calculating an adjusted new frequency of the CPU in inverse proportion to the ratio of memory access instruction acquired by the ratio acquiring unit; and
    a frequency adjusting unit connected with the frequency calculating unit for adjusting the frequency of the CPU to a new frequency of the CPU,
    wherein the frequency calculating unit employs a negative feedback mechanism to calculate the adjusted new frequency of the CPU by the following equation:

$$f_{new}=f_{now}+p_1*(-m),$$

where $f_{now}$ is a current frequency of the CPU, $f_{new}$ is the adjusted new frequency of the CPU, m is the ratio of memory access instruction, and $p_1$ is a control parameter.

2. The apparatus according to claim 1, further comprising:
    a ratio threshold setting unit for setting a threshold of ratio of memory access instruction, wherein
    the frequency calculating unit further comprises:
    a first difference calculating unit connected with the ratio threshold setting unit and the ratio acquiring unit for calculating a difference between the ratio of memory access instruction and the threshold of ratio of memory access instruction; and
    the frequency calculating unit employs a negative feedback mechanism to calculate the adjusted new frequency of the CPU by the following expression:

$$f_{new}=f_{now}+p_1*(m_t-m),$$

where $f_{now}$ is the current frequency of the CPU, $f_{new}$ is the adjusted new frequency of the CPU, m is the ratio of memory access instruction, $m_t$ is the threshold of ratio of memory access instruction, and $p_1$ is a control parameter.

3. The apparatus according to claim 1, further comprising:
a ratio of usage acquiring unit for acquiring a ratio of usage of the CPU;
a threshold of ratio of usage setting unit for setting a threshold of ratio of usage of the CPU; and
a ratio threshold setting unit for setting a threshold of ratio of memory access instruction, wherein
the frequency calculating unit further comprises:
a first difference calculating unit connected with the ratio threshold setting unit and the ratio acquiring unit for calculating a first difference between the ratio of memory access instruction and the threshold of ratio of memory access instruction; and
a second difference calculating unit connected with the ratio of usage acquiring unit and the threshold of ratio of usage setting unit for calculating a second difference between the ratio of usage of the CPU and the threshold of ratio of usage of the CPU, and
the frequency calculating unit employs a negative feedback mechanism to calculate the adjusted new frequency of the CPU by the following expression through a proportional controller:

$$f_{new}=f_{now}+p_1*(u-u_0)+p_2*(m_t-m),$$

where $f_{now}$ is the current frequency of the CPU, $f_{new}$ is the adjusted new frequency of the CPU, m is the ratio of memory access instruction, $m_t$ is the threshold of ratio of memory access instruction, u is the ratio of usage of the CPU, $u_0$ is the threshold of ratio of usage of the CPU, and $p_1$ and $p_2$ are control parameters.

4. The apparatus according to any one of claims 2 and 3, wherein the ratio acquiring unit further comprises:
an instruction number acquiring unit for reading a performance counter of the CPU to acquire a number of cache miss instructions $N_{cache\_miss}$; and
a ratio calculating unit for calculating the ratio m of memory access instruction by dividing the number of cache miss instructions $N_{cache\_miss}$ by a total number of instructions $N_{instr\_exec}$.

5. The apparatus according to any one of claims 2 and 3, wherein the frequency adjusting unit comprises:
a frequency adjuster for selecting a frequency value of the new frequency of the CPU which is closest to the adjusted new frequency of the CPU and is larger than the adjusted new frequency of the CPU from a frequency list supportable by the CPU based on the adjusted new frequency of the CPU and adjusting the frequency of the CPU to the new frequency of the CPU.

6. The apparatus according to any one of claims 1, 2 and 3 wherein the frequency of the CPU is adjusted periodically with a control period T and the control period T is at second level.

7. A method for dynamically adjusting a frequency of a CPU for a computer system which executes a CPU bound application and a memory bound application, the method comprising:
acquiring a ratio of memory access instruction as executing an application task set;
calculating an adjusted new frequency of the CPU in inverse proportion to the ratio of memory access instruction acquired; and
adjusting the frequency of the CPU to a new frequency of the CPU,
wherein the step of calculating the adjusted new frequency of the CPU in inverse proportion to the ratio of memory access instruction acquired comprises:
employing a negative feedback mechanism to calculate the adjusted new frequency of the CPU by the following expression:

$$f_{new}=f_{now}+p_1*(-m),$$

where $f_{now}$ is a current frequency of the CPU, $f_{new}$ is the adjusted new frequency of the CPU, m is the ratio of memory access instruction, and $p_1$ is a control parameter.

8. The method according to claim 7, further comprising before the step of calculating the adjusted new frequency of the CPU in inverse proportion to the ratio of memory access instruction acquired:
setting a threshold of ratio of memory access instruction, wherein
the step of calculating the adjusted new frequency of the CPU in inverse proportion to the ratio of memory access instruction acquired comprises:
calculating a difference between the ratio of memory access instruction and the threshold of ratio of memory access instruction; and
employing a negative feedback mechanism to calculate the adjusted new frequency of the CPU by the following expression:

$$f_{new}=f_{now}+p_1*(m_t-m),$$

where $f_{now}$ is the current frequency of the CPU, $f_{new}$ is the adjusted new frequency of the CPU, m is the ratio of memory access instruction, $m_t$ is the threshold of ratio of memory access instruction,. and $p_1$ is a control parameter.

9. The method according to claim 7, further comprising before the step of calculating the adjusted new frequency of the CPU in inverse proportion to the ratio of memory access instruction acquired:
acquiring a ratio of usage of the CPU;
setting a threshold of ratio of usage of the CPU; and
setting a threshold of ratio of memory access instruction, wherein
the step of calculating the adjusted new frequency of the CPU in inverse proportion to the ratio of memory access instruction acquired comprises:
calculating a first difference between the ratio of memory access instruction and the threshold of ratio of memory access instruction,
calculating a second difference between the ratio of usage of the CPU and the threshold of ratio of usage of the CPU, and
employing a negative feedback mechanism to calculate the adjusted new frequency of the CPU by the following expression:

$$f_{new}=f_{now}+p_1*(u-u_0)+p_2*(m_t-m),$$

where $f_{now}$ is the current frequency of the CPU, $f_{new}$ is the adjusted new frequency of the CPU, m is the ratio of memory access instruction, $m_t$ is the threshold of ratio of memory access instruction, u is the ratio of usage of the CPU, $u_0$ is the threshold of ratio of usage of the CPU, and $p_1$ and $p_2$ are control parameters.

10. The method according to any one of claims 7, 8, and 9, wherein the step of acquiring the ratio of memory access instruction further comprises:
reading a performance counter of the CPU to acquire a number of cache miss instructions $N_{cache\_miss}$; and
calculating the ratio m of memory access instruction by dividing the number of cache miss instructions $N_{cache\_miss}$ by a total number of instructions $N_{instr\_exec}$.

11. The method according to any one of claims 7, 8, and 9, wherein the step of adjusting the frequency of the CPU to the new frequency of the CPU comprises:

selecting a frequency value of the new frequency of the CPU which is closest to the adjusted new frequency of the CPU and is larger than the adjusted new frequency of the CPU from a frequency list supportable by the CPU based on the adjusted new frequency of the CPU and adjusting the frequency of the CPU to the new frequency of the CPU.

12. The method according to any one of claims 7, 8, and 9, wherein the frequency of the CPU is adjusted periodically with a control period T, and the control period T is at second level.

13. A computer system for executing a CPU bound application and a memory bound application, which comprises:

a controller for acquiring a ratio of memory access instruction as executing an application task set, calculating an adjusted new frequency of the CPU in inverse proportion to the ratio of memory access instruction acquired, and adjusting the frequency of the CPU to a new frequency of CPU, wherein calculating the adjusted new frequency of the CPU in inverse proportion to the ratio of memory access instruction acquired comprises:

employing a negative feedback mechanism to calculate the adjusted new frequency of the CPU by the following expression:

$$f_{new} = f_{now} + p_1 * (-m),$$

where $f_{now}$ is a current frequency of the CPU, $f_{new}$ is the adjusted new frequency of the CPU, m is the ratio of memory access instruction, and $p_1$ is a control parameter.

* * * * *